Feb. 28, 1928.

B. H. BLOOD 1,660,910

GEAR HOBBING MACHINE

Filed April 16, 1923

INVENTOR
B. H. Blood
BY
Joseph K. Schofield
ATTORNEY

Feb. 28, 1928.
B. H. BLOOD
GEAR HOBBING MACHINE
Filed April 16, 1923     4 Sheets-Sheet 3

Fig.3.

INVENTOR
B.H. Blood
BY
Joseph N. Schofield
ATTORNEY

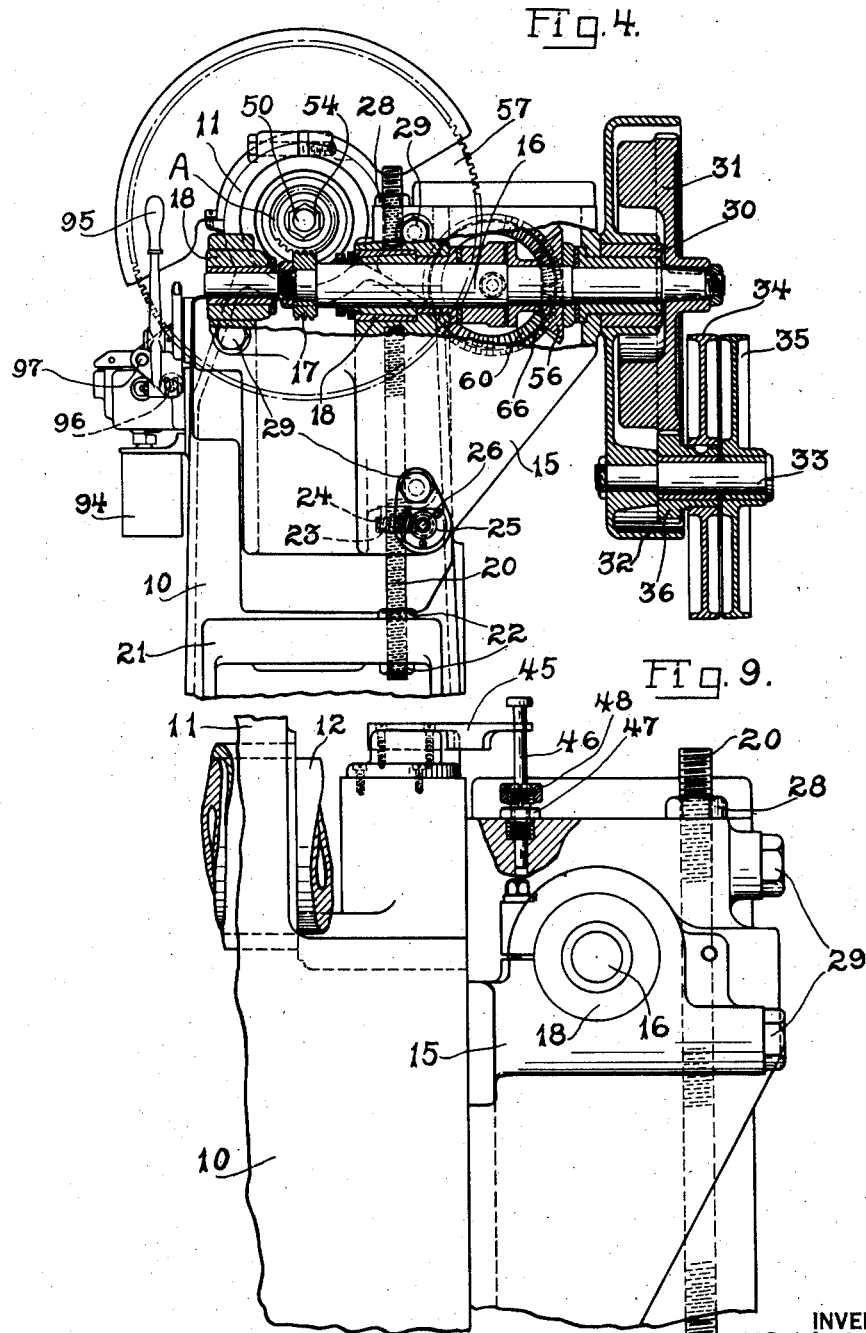

Patented Feb. 28, 1928.

1,660,910

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

GEAR-HOBBING MACHINE.

Application filed April 16, 1923. Serial No. 632,404.

This invention relates to gear hobbing machines and especially to a type of gear hobbing machine adapted particularly for the rapid production of duplicate gears within a narrow range of diameters.

More particularly, the machine is designed for the rapid production of gears used in automobile transmission systems, and means are provided to facilitate and expedite the production of duplicate gears of this type in large numbers.

Another object of the present invention is to provide a gear hobbing machine which will be simple, rapid and one which will not be readily put out of order.

Another object of the invention is to provide special and improved feeding means for the work spindle whereby this spindle may be advanced axially during the hobbing operation at different rates of speed in accordance with differences in the work or cutter.

One feature which enables me to provide a simple feeding mechanism for the work spindle is the provision of a screw mounted coaxially with the work spindle and engaging a nut rotatably mounted, preferably within the rear end of the work spindle. Means are provided for rotating the nut during the cutting operation and means are also provided for rotating the screw to effect a rapid traversing movement of the spindle in either direction.

Another object of the invention is to provide a novel form of driving connection between the hob spindle and the work spindle so that the work spindle may be driven directly from the hob spindle, or an intermediate spindle, without any lost motion or back lash to adversely effect the precision of the gears being hobbed. To accomplish this improved drive for the work spindle, two trains of geared connections are provided preferably extending from the hob spindle to a gear fastened directly to and movable axially with the work spindle. Means are provided between parts of these two driving connections to hold all of the lost motion between the parts in one direction.

Another object is to provide an improved controlling means for the machine enabling the preliminary adjustments and loading operations to be completed rapidly and to completely finish cutting operations on the blanks and stop.

Also, it is an object to provide improved rapid traversing means for the work spindle enabling this part to be moved axially while the preliminary adjustments are being made at relatively high speed and in either direction.

With these and other objects in view, my invention consists in the features of construction and operation set forth in the following specification and illustrated in the accompanying drawings.

In the drawings annexed hereto and forming a part of this specification, I have shown my invention embodied in a specific form of gear hobbing machine but it will be understood that the invention can be otherwise embodied and that the drawings are not to be construed as defining or limiting the scope of the invention, the claims appended to this specification being relied upon for that purpose.

In the drawings:

Fig. 3 is a horizontal sectional view of the complete machine.

Fig. 4 is a front elevation partly in section of the major portion of the complete machine.

Fig. 5 is a side view of a member forming part of the driving connections between the hob and work spindles.

Fig. 6 is an end view of the same member.

Fig. 7 is a side elevation partly in section of the control mechanism.

Fig. 8 is a sectional view of the same taken on line 8—8 of Fig. 7, and

Fig. 9 is a side elevation of a portion of the machine showing the means for gaging adjustments of the hob spindle.

Figure 1:
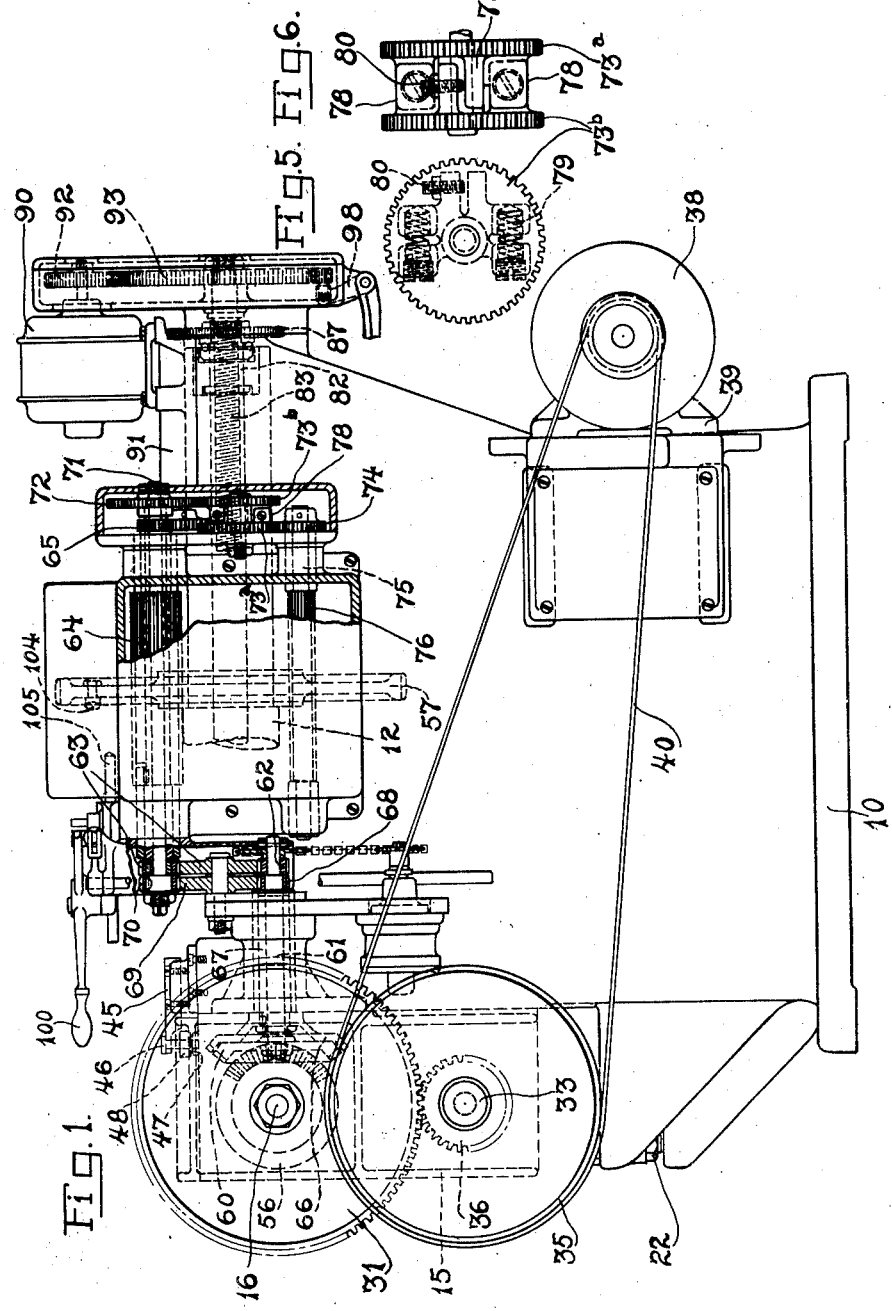
Figure 1 is a side elevation of the complete machine, some of the parts being shown in section to more clearly indicate their construction.

In the above mentioned drawings, I have shown but one modification of the invention which is now deemed preferable, but it is to be understood that changes and modifications may be made within the scope of the appended claims without departing from the spirit of the invention.

Briefly, my invention in its broadest aspect comprises the following principal parts: first, a base; second, a work spindle rotatably mounted therein in a manner permitting it to move axially; third, an adjustable bracket or knee mounted on ways provided on the forward vertical surface of the machine; fourth, a hob carrying spindle rotatably mounted in the bracket or knee; fifth, driving means for said hob spindle; sixth, two geared connections between the hob spindle and the work spindle including resilient means to prevent lost motion or back lash between the hob and work spindles; seventh, a nut rotatably mounted within the work spindle; eighth, a rotatably mounted screw in connection therewith, the nut and screw extending coaxially with the work spindle; ninth, means to rotate the nut preferably from one of the driving shafts extending between the hob spindle and work spindle; tenth, means to rotate the screw in either direction relatively rapidly, and eleventh, controlling means whereby the cycle of operations may be expeditiously carried out and the machine automatically stopped.

Referring more in detail to the figures of the drawings, I provide a base 10 having aligned horizontal bearings 11 in its upper portion in which may be mounted a rotatable work supporting spindle 12. This spindle 12 is not only rotatably mounted within its bearings 11 but it is so designed that it may be advanced axially a limited distance in either direction during the operation of the machine. The means for rotating and axially advancing this work spindle 12 will presently be described.

On the front vertical surface of the base is mounted an adjustable knee or bracket 15 in which is rotatably mounted a hob rotating spindle 16 carrying a hob 17 in its intermediate portion. As shown in Fig. 4, this hob spindle 16 is rotatable in bearings 18 provided in the knee 15 which are preferably positioned on opposite sides of the hob 17 so that this hob will be rigidly supported. Also, as shown in Fig. 3, the hob spindle 16 is preferably not positioned in a plane normal to the axis of the work spindle 12 but is disposed obliquely thereof at an angle approximately two or three degrees more than a right angle. To adjust the position of the bracket 15 and spindle 16 vertically to accommodate the machine for operating upon gears of different diameters or with hobs of different sizes, a fixed screw 20 is provided preferably extending through a fixed bracket 21 provided on the machine base 10 and rigidly fastened thereto as by nuts 22. This screw 20 passes through the hob carrying bracket 15 and, by means of a nut 23 engaging the screw 20, the position of the bracket 15 may be varied. As shown in Fig. 4, the nut 23 bears against the lower surface of the bracket 15. In order to rotate this nut 23, it is provided with gear teeth 24 engaging another gear 25 or worm on a short shaft 26. By rotating this shaft 26, the vertical position of the bracket 15 may be quickly and easily varied. In order to rigidly support the bracket 15 in its adjusted position, a nut 28 is provided on the upper end of the screw 20 so that it may bear against the upper horizontal surface of the bracket 15. In this way, the vertical position of the bracket 15 and spindle 16 is easily maintained or adjusted. Also clamping screws 29 are provided passing through the bracket 15 and being threaded into the base 10 to aid in rigidly supporting the bracket and spindle.

As shown most clearly in Figs. 3 and 4, the hob spindle is extended in one direction and passes through an auxiliary or outer bearing 30 also provided on the bracket 15. A gear 31 is rigidly fastened to this hob spindle 16, which preferably may be weighted thus providing fly-wheel effect to improve the cutting action of the hob 17. Below the gear 31 on the hob spindle 16 and suitably mounted in a member 32 surrounding the bearing 30 for the hob spindle, is a short stud or shaft 33. This shaft 33 is provided with a tight and loose pulley 34 and 35 and also with a gear 36 fastened directly to the pulley 34. In this way rotation of this gear 36 and pulley 34 will rotate the hob spindle 16. Obviously, these pulleys 34 and 35 may be driven from any suitable source but I preferably mount an electric motor 38 on a suitable bracket 39 provided on one of the vertical surfaces of the base 10. This motor 38 by means of a belt 40, is in driving connection with either of the pulleys. A belt shifting device 42 is also provided whereby the belt 40 may be moved from one to the other of these pulleys 34 or 35. The belt shifter 42 is preferably automatically controlled to stop operation of the machine which means will presently be described.

As the adjusting device for the knee 15 above defined cannot be used to position the hob 17 accurately relative to particular blanks A being hobbed, I provide special auxiliary adjusting means for this purpose. On the forward upper portion of the base is a small arm or plate 45 fixed to and outstanding from the base 10 and directly overhanging the bracket or knee 15. This is provided with a hole through which may pass a vertically disposed rod 46 adjustably secured to the knee 15. As shown in Fig. 9, the rod 46 passes through a sleeve 47 fixed rigidly in the bracket 15. Around the sleeve is a nut 48 threaded thereto so that the rod 46 may be tightly gripped by the sleeve 47. It will be seen that with this construction, variations in the elevation of the knee 15 will vary the position of the adjustable rod relative to the arm 45. Preferably, the rod 46 is provided with a head so that a micrometer may be placed in engagement with the upper surface of the rod 46 and also in contact with the lower horizontal surface of the arm 45. For this purpose the end surface of the rod 46 and the lower surface of the plate 45 are accurately formed to provide gaging surfaces. Variations in the position of the bracket 15 may thus be precisely determined. This auxiliary adjusting means is preferably utilized in the following manner: Gear blanks A are mounted on the work spindle 12 and, with the knee 15 adjusted approximately to position, a preliminary cut is taken. The blanks are then tested for size and their error determined. With a reading obtained by a micrometer placed so that it surrounds the lower surface of the bracket 45 and the upper surface of the rod 46, as above defined, the operator is enabled to determine exactly what amount the bracket is to be elevated or depressed to correctly position the hob 17 to cut to the precise depth. The bracket or knee 15 is then elevated by means of a rotating nut 23 the required amount until the difference in readings indicates that the correct adjustment has been made.

Preferably, the work A is secured to the work spindle 12 by means of a rod 50 outstanding from the spindle 12 and which may be formed on a tapered member 51 as shown clearly in Fig. 3. This tapered member or tang 51 may be drawn rearwardly into position by rotation of a bar 52 extending completely through the spindle 12. To place work blanks A on the spindle 12 and remove them therefrom, it is merely necessary to remove a collar 53 and nut 54 provided on the outer threaded end of the rod 50. Obviously, other fastening means of different types may be provided for securing different types of gears to the spindle 12.

In order to drive the work spindle 12 in timed relation to the hob spindle 16, gear driving connections are provided driven from a bevel gear 56 on the hob spindle 16 and engaging a spur gear 57 fastened to and movable with the work spindle 12. As it is a particular object of the present invention to provide means for accurately hobbing gears, it is essential that all lost motion or back lash between the hob and work spindles 16 and 12 be eliminated. This is accomplished in an improved manner through two separate and independent driving means which are driven from the same bevel gear 56 and which drive elongated pinions directly contacting with the gear 57 on the work spindle 12. Both of these connections are designed so that they have precisely the same speed ratio. These connections will be most clearly seen in Figs. 1 and 3.

One of the driving connections comprises a bevel gear 60 in engagement with the bevel gear 56 on the hob spindle 16, this bevel gear 60 being mounted upon a shaft 61 rotatably supported in a part fixed to the base 10 which through change gears 63, drives an elongated pinion 64. This shaft 61 is provided with a gear 62 at its opposite end which is in mesh with one of the change gears 63. The pinion 64 is on a shaft or sleeve having a gear 65 thereon at its opposite end for a purpose presently to be described. Adjacent the bevel gear 60 is another bevel gear 66 also in contact with the bevel gear 56 on the hob spindle 16 and which is mounted on the end of a sleeve 67 concentric with the shaft 61 mounting the other bevel gear 60. This sleeve 67 has a gear 68 at its opposite end which drives another pinion 70 through intermediate gear 69, as shown most clearly in Fig. 1. Gears 69 and 70 may be changed for gears of other sizes to vary the ratio between the gear 68 and shaft 71.

The pinion 70 is on the shaft 71 which may extend axially through the elongated pinion 64 and which is provided with a gear 72 at its opposite end. Gear 72 is in mesh with one of the gears of a double or compound gear 73 the other gear of which meshes with a gear 74 on a shaft 75 carrying a second elongated pinion 76 contacting with the gear 57 on the work spindle 12.

The gear ratio for each of these two driving connections is designed so that it is precisely equal to the other, and, it will be seen, without some connection between these two driving gears, any lost motion or back lash between the parts would permit the work spindle 12 to oscillate slightly back and forth while rotating which would adversely effect the precision of the work produced by the machine. I therefore provide the construction as shown in detail in Figs. 5 and 6 referred to above as a compound gear 73. This gear 73 preferably takes the form of a pair of gears 73$^a$ and 73$^b$ of equal diameter and number of teeth. It is through this pair of gears that the second pinion 76 is driven. These gears 73$^a$ and 73$^b$ forming the pair are provided with extensions 78 as shown in Figs. 5 and 6 in which may be mounted springs 79. Also, a set screw 80 may be provided to limit the maximum action of these springs. The effect of these springs, or other resilient means, between these extensions 78 is to advance the driving connections for pinion 76 as far as possible permitted by the driving connections for the pinion 64. Thus a resilient action will be constantly exerting this advancing force on one of the elongated pinions and preventing the work spindle 12 from moving backward due to any lost motion or back lash. It will therefore be seen that the work spindle 12 is held precisely and firmly in its proper angular position at all times during operation of the machine.

The pinions 64 and 76 forming part of the above mentioned driving connections are made sufficiently long so that the gear 57 on the work spindle 12 will be maintained in connection therewith during all of the axial positions assumed during operation. Provision of these elongated pinions 64 and 76 also obviates the necessity of spline connections within the driving connections.

During operation, as above stated, the work spindle 12 is advanced axially relatively slowly during the cutting operation. It is desirable also that this rate of feed may be varied for different diameters of work or for different materials and different types of hobs. I therefore provide new and improved feeding mechanisms for this work spindle 12.

Figure 2:
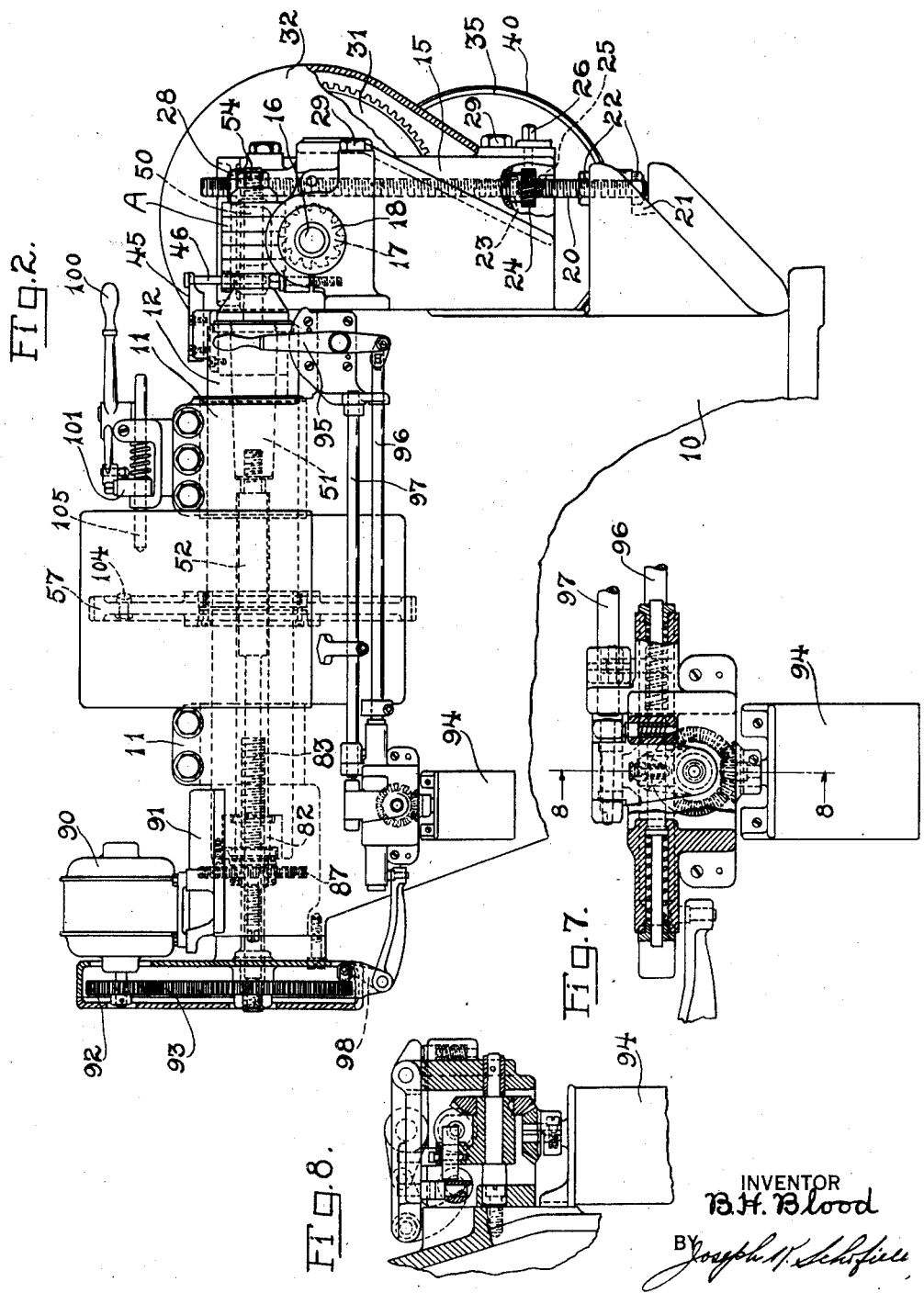
Fig. 2 is an elevation of the complete machine taken from the opposite side of the machine from Fig. 1.

Referring particularly to Figs. 1, 2 and 3, it will be seen that in the rear of the work spindle 12, a rotatable nut 82 is provided which is adapted to engage a screw 83 mounted coaxially with the work spindle 12 and extending into a suitable hole through the spindle. Assuming that the screw 83 is held from rotation, it will be seen that rotation of the nut 82 will advance or retract the work spindle axially depending upon its direction of rotation. In order to accomplish this axial movement of the work spindle 12, driving connections are provided preferably comprising a shaft 84 geared to one of the driving connections for the work spindle 12 such as the gear 65. This shaft 84 drives an elongated pinion 85 through suitable change gearing 86, the elongated pinion 85 lying adjacent to and parallel with the axis of the work spindle 12. In engagement with this elongated pinion 85 is a spur gear 87 attached to and rotating with the nut 82. Therefore, it will be seen that as the hob and work spindles 16 and 12 are rotated in timed relation to each other by means of these driving connections, the work spindle 12 is advanced at a speed determined by the gearing 86 and the pitch of screw 83. This advancing movement is very slow and adapted for feeding the spindle 12 during the cutting operation but may be varied within a wide range so that the surfaces of the gears A being cut by the hob may be generated as rapidly as conditions will admit.

It is also essential for rapid production that traversing means be provided for the work spindle 12 to retract it to its initial position after blanks A have been completely finished and removed from the spindle. Also, it is desirable to rapidly advance the spindle 12 until the hob 17 is about to start operating upon a new set of blanks A when these are mounted in position. For this purpose, I provide means for relatively rapidly rotating the screw 83 in either direction. These means preferably comprise a small electric motor 90 suitably mounted on the bracket 91 on the base and having a pinion 92 on its armature shaft in engagement with a spur gear 93 directly fastened to the screw 83. By rotating the motor 90 in either direction the work spindle 12 may be axially moved to any desired position. For this purpose a controller 94 of conventional form for the motor 90 is provided. This controller 94 is attached to and operated by control lever 95 through the operating rod 96 so that the motor 90 may be rotated to move the spindle 12 to predetermined points in its stroke.

To maintain the screw 83 in fixed position and to prevent its rotating during the cutting operation and while the traversing motor 90 is stopped, a suitable brake 98 is provided bearing against one of the sides of this gear 93. This brake 98 may be moved to operative and inoperative positions by controlling mechanism actuated by lever 95 and rod 96.

As the particular form of the controlling mechanism does not constitute a part of my invention, it will not be specifically described. It will suffice to state that actuation of the hand lever 95 through the reach rod 96 actuates the controller 94 to start the motor 90 and to advance the work spindle. Simultaneously with this movement of the rod 96, the brake 98 is released. As soon as the work spindle is advanced so that the hob 17 engages the work A, the motor 90 is stopped and the brake 98 again engaged.

The belt shifter 42 previously referred to is actuated by hand lever 100 to move the belt onto the driving pulley 34. The shift 42 is retained in this position by an oscillating latch 101 having a stud in engagement with the rear end of one of the actuating rods 102. This rod 102 as shown is moved in the opposite direction to move the belt onto the loose pulley 35 by a spring 103. To disengage the latch 101, a stud 104 is fixed to one of the faces of the gear 57 so that when the cutting operation is complete, a spring-pressed rod 105 will be moved to oscillate the latch 101 and permit the belt shifter 42 to move the belt 40 onto the loose pulley.

From the above, it will be seen that when the machine is ready for operation, movement of the hand lever 95 will cause the work spindle 12 to be advanced rapidly until the cutting operation is about to start, after which the rapid traverse mechanism will be discontinued. Actuation of lever 100 will start the hob spindle 16 and work spindle 12 rotating and will simultaneously start the feeding movement of the spindle 12. Completion of the feeding movement of the spindle 12 will cause the belt shifter 42 to operate so that the machine will be stopped. The finished gear blanks A may then be removed. Hand lever 95 may then be moved in a direction to cause the motor 90 to return the spindle 12 to its initial position at which time the machine is again ready to be loaded with new blanks and its operations repeated.

What I claim is:

1. A gear hobbing machine comprising in combination, a base, a work spindle rotatably mounted and axially movable therein, a hob spindle adjustable toward and from the work spindle, driving means for the hob spindle, a driving connection from said hob spindle to said work spindle to rotate it in timed relation thereto, a nut rotatably mounted within the work spindle, a normally fixed screw in engagement therewith, means to rotate said nut whereby said work spindle may be advanced axially while it is being rotated, and means to rotate said screw to effect a rapid axial movement of the work spindle.

2. A gear hobbing machine comprising in combination, a base, a work spindle rotatably mounted and axially movable therein, a hob spindle angularly disposed thereto, means to adjust the positions of said spindles toward and from each other, means to rotate said spindles in variable timed relation to each other, a screw rotatably mounted relative to the work spindle, a nut rotatably mounted within the work spindle in engagement with said screw, means to rotate the nut during the feeding operation, and means to rotate the screw to effect rapid traverse movement of the work spindle.

3. A gear hobbing machine comprising in combination, a base, a work spindle rotatably mounted and axially movable therein, a hob spindle angularly disposed thereto, means to adjust the positions of said spindles toward and from each other, means to rotate said spindles in variable timed relation to each other, a screw rotatably mounted relative to the work spindle, a nut rotatably mounted within the work spindle in engagement with said screw, means independent of the work spindle to rotate the nut in one direction to effect feeding movement of the work spindle, and means to rotate the screw in opposite directions to effect a rapid return movement of the work spindle.

4. A gear hobbing machine comprising in combination, a base, a work spindle, a hob spindle, means to rotate said spindles in timed relation to each other, means to advance the work spindle axially during operation, power means to rapidly move said work spindle axially in either direction, frictional braking means normally maintaining said power means from advancing said spindle, and means to release said brake when said power means are operated.

5. A gear hobbing machine comprising in combination, a base, a work spindle, a hob spindle, means to rotate said spindles in timed relation to each other, means to advance the work spindle axially during operation, power means comprising a motor to rapidly move said work spindle axially in either direction, breaking means normally maintaining said power means from advancing said spindle, and means to release said brake when said power means are operated.

6. A gear hobbing machine comprising in combination, a base, a work spindle, a hob spindle, means to rotate said spindles in timed relation to each other, a motor for operating said means, means to advance the work spindle axially during operation, a motor to rapidly move said work spindle predetermined adjustable distances axially in either direction, frictional braking means normally maintaining said power means from advancing said spindle, and means to release said brake when said power means are operated.

7. A gear hobbing machine comprising in combination, a base, a work spindle, a hob spindle, means to rotate said spindles in timed relation to each other, a motor for operating said means, means to feed the hob spindle axially during operation, a motor to rapidly return said work spindle in a direction opposite to its feeding direction and advance the spindle to cutting position, frictional braking means normally maintaining said power means from advancing said spindle, and means to release said brake when said power means are operated.

In testimony whereof, I hereto affix my signature.

BRYANT H. BLOOD.